United States Patent
Liu et al.

(10) Patent No.: US 12,468,057 B2
(45) Date of Patent: Nov. 11, 2025

(54) DETECTION OF HYDROCARBON PRESENCE IN SUBSURFACE FROM SEISMIC IMAGES USING RELATIONAL LEARNING

(71) Applicant: ExxonMobil Technology and Engineering Company, Spring, TX (US)

(72) Inventors: Kuang-Hung Liu, Basking Ridge, NJ (US); Huseyin Denli, Basking Ridge, NJ (US); Mary Johns, Houston, TX (US); Jacquelyn Daves, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 379 days.

(21) Appl. No.: 18/027,266

(22) PCT Filed: Sep. 13, 2021

(86) PCT No.: PCT/US2021/071435
§ 371 (c)(1),
(2) Date: Mar. 20, 2023

(87) PCT Pub. No.: WO2022/061329
PCT Pub. Date: Mar. 24, 2022

(65) Prior Publication Data
US 2023/0375735 A1    Nov. 23, 2023

Related U.S. Application Data

(60) Provisional application No. 62/706,942, filed on Sep. 18, 2020.

(51) Int. Cl.
*G01V 1/30* (2006.01)
*G01V 1/28* (2006.01)

(52) U.S. Cl.
CPC .............. *G01V 1/301* (2013.01); *G01V 1/282* (2013.01)

(58) Field of Classification Search
CPC .............................. G01V 1/301; G01V 1/282
See application file for complete search history.

(56) References Cited

U.S. PATENT DOCUMENTS 11,048,000 B2 *  6/2021  Salman ................. G01V 1/306
11,609,352 B2 *  3/2023  Denli ....................... G06N 3/08

OTHER PUBLICATIONS

Li et al., "Prediction of Subsurface NMR T2 Distributions in a Shale Petroleum System Using Variational Autoencoder-Based Neural Networks", Dec. 2017, IEEE Publication, vol. 14, No. 12, pp. 2395-2397. (Year: 2017).*

(Continued)

*Primary Examiner* — Elias Desta
(74) *Attorney, Agent, or Firm* — Lempia Summerfield Katz LLC

(57) ABSTRACT

A computer-implemented method for detecting geological elements or fluid in a subsurface from seismic images is disclosed. Seismic data may be analyzed to identify one or both of fluid or geologic elements in the subsurface. As one example, the analysis may include unsupervised learning, such as variational machine learning, in order to learn relationships between different sets of seismic data. For example, variational machine learning may be used to learn relationships among partially-stack images or among pre-stack images in order to detect hydrocarbon presence. In this way, an unsupervised learning framework may be used for learning a Direct Hydrocarbon Indicator (DHI) from seismic images by learning relationships among partially-stack or pre-stack images.

20 Claims, 13 Drawing Sheets

(56) References Cited

OTHER PUBLICATIONS

International Search Report for International Patent Application PCT/US2021/071435 mailed Dec. 23, 2021.
Written Opinion for International Patent Application PCT/US2021/071435 mailed Dec. 23, 2021.
Veillard A. et al.: "Fast 3D Seismic Interpretation with Unsupervised Deep Learning: Application to a Potash Network in the North Sea," 80th EAGE Conference & Exhibition, [Online] Jun. 11, 2018 (Jun. 11, 2018), XP055867954.
Ross Christopher P. : "Unbiased AVO crossplotting?", The Leading Edge, [Online] vol. 35, No. 4, Apr. 1, 2016 (Apr. 1, 2016), pp. 338-344, XP055868435, US ISSN: 1070-485X, DOI:10.1190/tle35040338.1.
Ben Bougher et al: "AVA classification as an unsupervised machine-learning problem", SEG Technical Program Expanded Abstracts 2016, Sep. 30, 2016 (Sep. 30, 2016), pp. 553-556, XP055641770, DOI: 10.1190/segam2016-13874419.1.

* cited by examiner

DETECTION OF HYDROCARBON PRESENCE IN SUBSURFACE FROM SEISMIC IMAGES USING RELATIONAL LEARNING

CROSS REFERENCE TO RELATED APPLICATIONS

This application claims the benefit of U.S. Provisional Application 62/706,942, filed Sep. 18, 2020, the entirety of which is incorporated by reference herein.

FIELD OF THE INVENTION

The present application relates generally to the field of hydrocarbon production. Specifically, the disclosure relates to a methodology for detecting hydrocarbon presence in a subsurface from seismic images using relational learning.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

One step of hydrocarbon prospecting is to accurately model subsurface geologic structures and detect fluid presence in those structures. For example, a geologic model, which may comprise a computer-based representation, such as a two-dimensional ("2D") representation or a three-dimensional ("3D") representation, of a region beneath the earth's surface. Such models may be used to model a petroleum reservoir, a depositional basin, or other regions which may have valuable mineral resources. Once the model is constructed, it may be used for various purposes, many of which are intended to facilitate efficient and economical recovery of the valuable resources. For example, the geologic model may be used as an input to simulations of petroleum reservoir fluid flows during production operations, which are used to plan well placements and predict hydrocarbon production from a petroleum reservoir over time.

In particular, a seismic survey may be gathered and processed to create a mapping (e.g. subsurface images such as 2-D or 3-D partially-stacked migration images presented on a display) of the subsurface region. The processed data may then be examined (e.g., by performing an analysis of seismic images) with a goal of identifying subsurface structures that may contain hydrocarbons. Some of those geologic structures, particularly hydrocarbon-bearing reservoirs, may be directly identified by comparing pre- or partially-stacked seismic images (e.g. near-, mid- and far-stack images).

One quantitative way of comparing the stack images is based on analysis of amplitude changes with offset or angle (amplitude versus offset (AVO) or amplitude versus angle (AVA)). Examples of AVO and AVA are disclosed in US Patent Application Publication No. 2003/0046006, US Patent Application Publication No. 2014/0278115, US Patent Application Publication No. 2020/0132873, and U.S. Pat. No. 8,706,420, each of which is incorporated by reference herein in their entirety.

Typically, the relationship among the pre- or partially-stacked images (e.g., transition from near-stack to far-stack images) are considered to be multimodal (e.g., exhibiting multiple maxima) due to the offset-dependent responses of the geological structures and fluids (e.g., amplitude-versus-offset responses of hydrocarbon bearing sand, water-bearing sand, shale facies or salt facies can be different). It may be easier to detect such AVO changes in clastic reservoirs than ones in carbonate reservoirs. At reflection regimes, the relations among the stack images (AVO) may be explained by the Zoeppritz equation that describes the partitioning of seismic wave energy at an interface, a boundary between two different rock layers. Typically, the Zoeppritz equation is simplified for the pre-critical narrow-angle seismic reflection regimes and range of subsurface rock properties (e.g., Shuey approximation), and may be reduced to:

$$R(\theta) = A + B \sin^2(\theta) \tag{1}$$

where R is the reflectivity, $\theta$ is the incident angle, A is the reflectivity coefficient at zero incident angle ($\theta=0$), and B is the AVO gradient. The stack images may be used to determine A and B coefficients. These coefficients may be estimated over each pixel over the seismic image, over a surface (boundaries along the formations) or over a geobody (e.g., performing mean and standard deviations of A and B values over a geobody region). AVO is not the only indicator of fluid presence and may not be the most reliable indicator because the fluid effects may be obscured due to the inaccuracies in seismic processing, the seismic resolution, and presence of noise or the seismic interference of thin beds. Other hydrocarbon indicators may be useful for derisking hydrocarbon presence include: amplitude terminations; anomaly consistency; lateral amplitude contrast; fit to structure; anomaly strength; and fluid contact reflection. Thus, distributions of A and B values may be interpreted to distinguish the AVO anomalies from the background as an AVO response of hydrocarbon presence is expected to be an anomaly. Further, this AVO analysis may be combined with the other indicators to increase the confidence around fluid presence.

SUMMARY OF THE INVENTION

In one or some embodiments, a computer-implemented method for detecting geological elements or fluid in a subsurface from seismic images is disclosed. The method includes: accessing different sets of seismic data; performing unsupervised machine learning on the different sets of seismic data in order to learn one or more relational properties between the different sets of seismic data; interpreting the one or more relational properties using reference data points to identify one or both of the geological elements or the fluid; and performing one or more actions in the subsurface based on the identified one or both of the geological elements or fluid.

to BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION OF THE INVENTION

Figure 1:
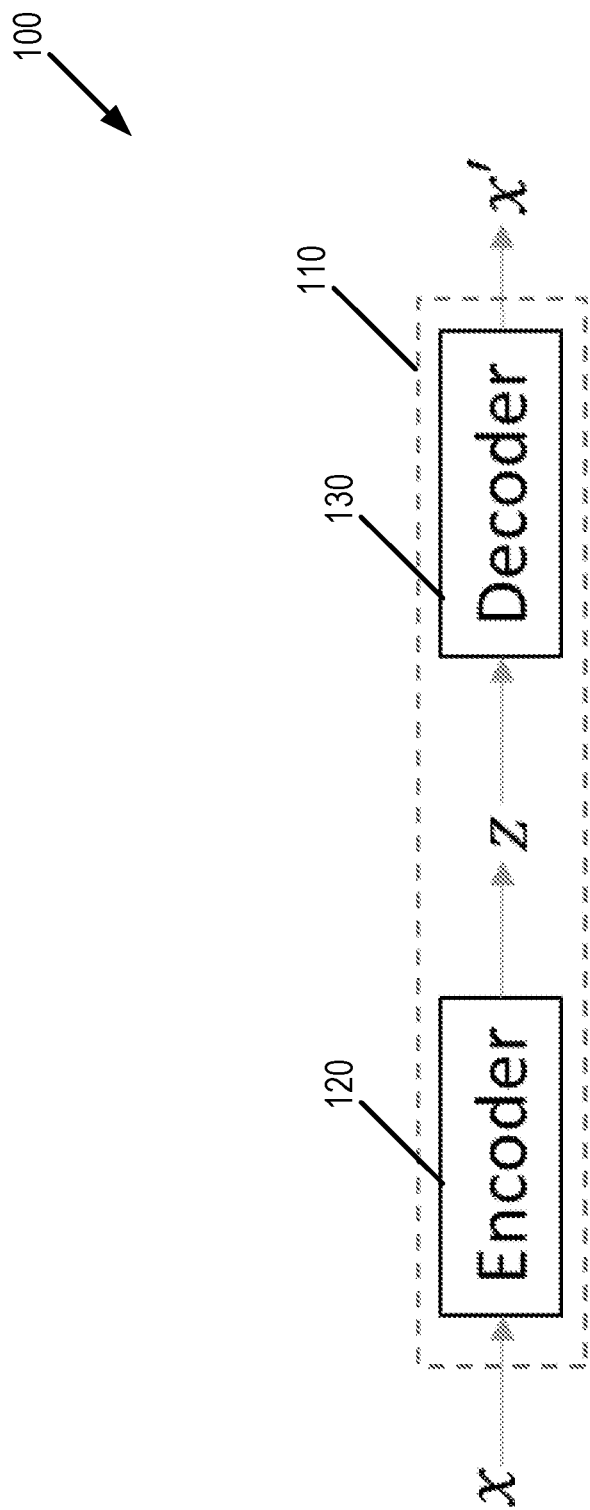
FIG. 1 shows a block diagram of an autoencoder.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying and interpretation process, including displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or interpretation quantities, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying and interpretation process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (e.g., acoustic) data sets in conjunction with other geophysical data, including, for example, gravity plus seismic; gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

Subsurface model is a numerical, spatial representation of a specified region in the subsurface.

Geologic model is a subsurface model that is aligned with specified faults and specified horizons.

Reservoir model is a geologic model where a plurality of locations have assigned properties including any one, any combination, or all of rock type, environment of deposition (EoD), subtypes of EoD (sub-EoD), porosity, permeability, fluid saturations, etc.

For the purpose of the present disclosure, subsurface model, geologic model, and reservoir model are used interchangeably unless denoted otherwise.

Stratigraphic model is a spatial representation of the sequences of sediment and rocks (rock types) in the subsurface.

Structural model or framework results from structural analysis of reservoir based on the interpretation of 2D or 3D seismic images. For examples, the reservoir framework comprises horizons, faults and surfaces inferred from seismic at a reservoir section.

As used herein, "hydrocarbon management" or "managing hydrocarbons" includes any one, any combination, or all of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

Seismic data may be analyzed to identify one or both of fluid or geologic elements in the subsurface. As one example, seismic data may be analyzed to detect the presence of hydrocarbon in order to perform hydrocarbon management. As another example, seismic data may be analyzed to categorize different rock types or lithology (e.g., seismic inversion produces derivative volumes such as Vclay and porosity, whose relationship may be used to categorize different rock types or lithology). In this regard, various fluids or geologic elements in the subsurface may be recognized based on analysis of one or more types of seismic input derivative volumes.

As discussed in the background, AVO analysis may be used to detect hydrocarbon in a subsurface. In particular, the input derivative volumes may be derived from the offset cubes, such as the AVO intercept and gradient volumes. These relationships may potentially show presence of fluid, and may also show confidence in the anomaly by its signature with respect to the background. The intercept/gradient relationship may further be used to determine lithology. However, there are several drawbacks in the typical AVO analysis. First, the Zoeppritz equation is a crude approximation to the relationships of the field pre- and partially stacked images because of the complex interactions of seismic waves, noise and inaccuracies in processing and migration imaging. Such equations may be useful for reasoning about how seismic waves interact with the subsurface; however, these equations may be insufficient to process the data. Second, flat reflections may be caused by a change in stratigraphy and may be misinterpreted as a fluid contact. Third, rocks with low impedance could be mistaken for hydrocarbons, such as coal beds, low density shale, ash, mud volcano, etc. Fourth, polarity of the images may be incorrect, causing a bright amplitude in a high impedance zone. Fifth, AVO responses may be obscured by superposition of seismic reflections and tuning effects. Sixth, signals may be contaminated with systematic or acquisition noise.

In order to overcome any one, any combination, or all of the deficiencies in the art, in one or some embodiments, a machine learning method is used. In particular, an unsupervised learning method is used in order to learn relationships between different sets of seismic data. As one example, the unsupervised learning method may be used to learn relationships among partially-stack images or among pre-stack images in order to detect hydrocarbon presence. In this way, an unsupervised learning framework may be used for learning a Direct Hydrocarbon Indicator (DHI) from seismic images by learning relationships among partially-stack or pre-stack images. Thus, any discussion regarding using an unsupervised learning method to learn relationships among partially-stack images or among pre-stack images may be generally applied to learning relationships between different sets of images, or may more generally be applied to learning relationships between different sets of seismic data.

Various methods of unsupervised learning are contemplated. For example, one methodology of unsupervised learning for extracting features from images is based on autoencoders, such as shown in the block diagram 100 in FIG. 1. An autoencoder 110 may learn a latent representation Z while reconstructing the image along with the following two functions: (1) an encoding function (performed by encoder 120) parameterized by θ that takes in image x as an input and outputs the values of latent variable z=(x); and (2) a decoding function (performed by decoder 130) parameterized by μ it that takes in the values of latent variables and outputs an image, x'=(z).

Training of an autoencoder may determine θ and μ by solving the following optimization problem:

$$\underset{\theta,\mu}{\mathrm{argmin}} \|x - D_\mu(E_\theta(x))\| \text{ where } \|x\| = \sqrt{\sum x_i^2} \quad (2)$$

Figure 2:
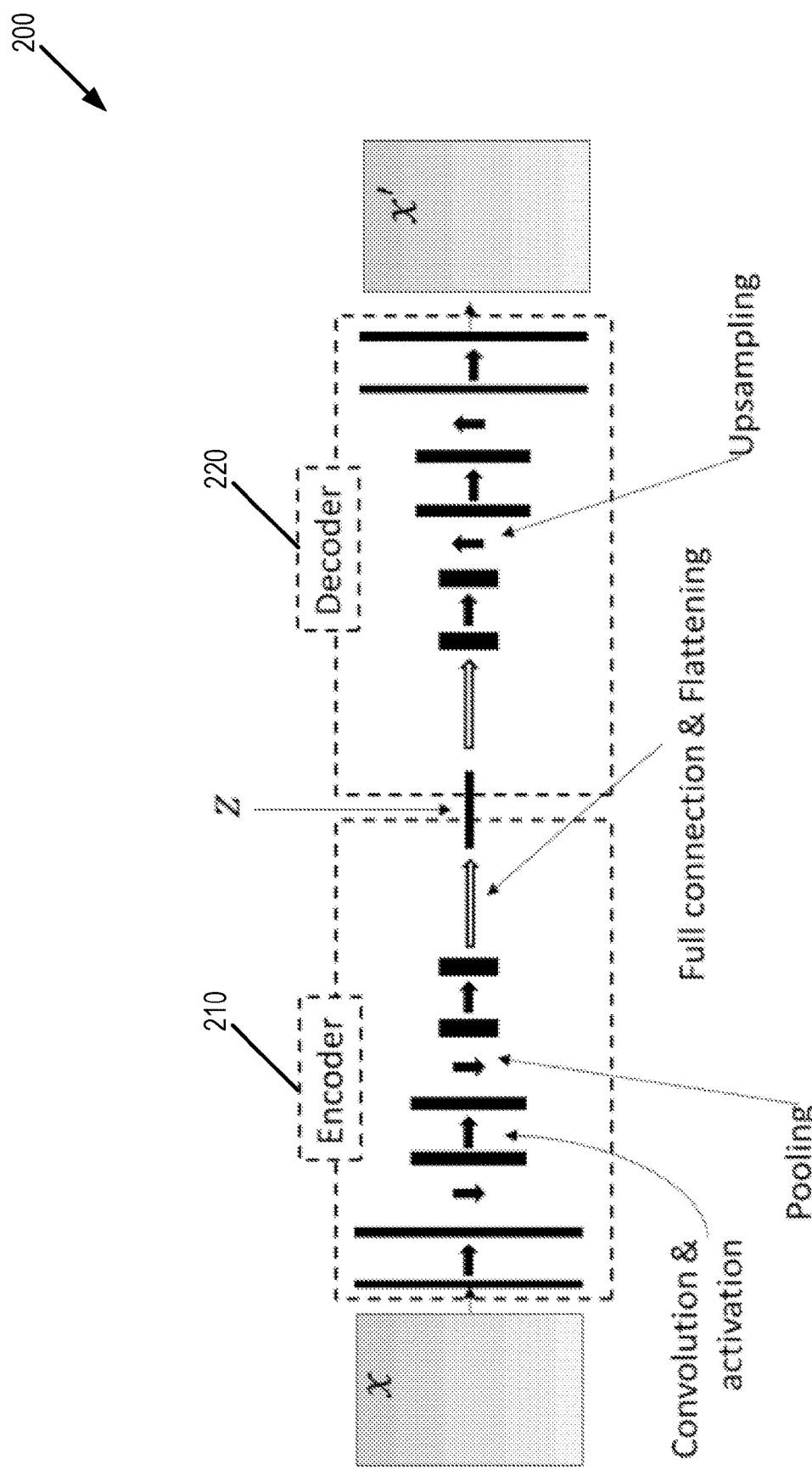
FIG. 2 shows a block diagram of an autoencoder architecture.

After training, one may use the learned encoding function (x) to map an image (or a portion of image such as a patch) to its latent space representation in Z. This representation of the image may be used for the image analysis. An example of an autoencoder architecture, which may include encoder 210 and decoder 220, is shown in the block diagram 200 in FIG. 2.

The latent space typically captures the high-level features in the image x and has dimension much smaller than that of x. It is often difficult to interpret the latent space because the mapping from x to z is nonlinear and no structure over this space is enforced during the training. One approach may be to compare the images in this space with a reference images (or patch) using a distance function measuring similarity between the pair (e.g. $|z_x - z_{Reference}|$, where $z_x = E_\theta(x)$ and $z_{reference} = E_\theta(x_{reference})$). See A. Veillard, O. Morère, M. Grout and J. Gruffeille, "Fast 3D Seismic Interpretation with Unsupervised Deep Learning: Application to a Potash Network in the North Sea", EAGE, 2018. There are two challenges for detecting DHIs with such an approach. First, DHIs are anomalous features in seismic images and autoencoders are designed to represent salient features, not the anomalous features. Anomalous features are typically treated as statistically not meaningful for reconstructing image. Second, an autoencoder cannot guarantee to cluster image features in latent space and they may not be separable in the latent space.

Typically, identifying fluid presence from seismic data depends heavily on engineered image attributes, which may lead to unduly noisy results and may not lend itself to automation, but may help the interpreter to select the fluids presence. Conversely, machine learning approaches based on supervised learning do not rely on the feature engineering, but require an abundant amount of labelled. examples to train. The requirement of a large amount of labelled training data is a challenge for many important interpretation tasks, particularly for DHIs. One reason is that generating labelled data for fluid detection is a labor-intensive process. Another reason is that DHIs are often difficult to pick, particularly subtle DHIs. This limits the total number of training data that may be generated even if with unlimited resources.

Given this, unsupervised machine learning methodologies are particularly suited to detecting DHIs from seismic images. For example, in one or some embodiments, relational learning (such as variational relation learning), may be used to learn the relationships between pairs of images for detecting DHIs. Various unsupervised machine learning methodologies are contemplated. Specifically, the unsupervised machine learning methodology discussed below learns latent variable models; however, other unsupervised machine learning methodologies are contemplated, including based on: clustering; anomaly detection; or neural networks.

Thus, relational learning, such as variational relation learning, may be used to analyze different images (such as different sets of images). The analysis may comprise identifying fluid presence from the seismic images, such as by analyzing changes among pre-or partially- stack images. However, other types of analysis and other types of images are contemplated. In this regard, any discussion regarding near-stack and fax-stack images may be applied to any two types of seismic images A and B. The relational learning may also be extended to pre-stack images with many pairs of A and B images. For instance, the consecutive stack slices may be considered as A and B images, Further, any discussion regarding changes between near-stack and far-stack images to determine the fluid type (e.g., hydrocarbon or water) may likewise be applied to other types of analysis of the two types of seismic images.

With regard to analysis of near-stack and far-stack images, AVO may measure the amplitude changes between near-offset and far-offset images. In this case, A represents near-offset images and B represents far-offset images. Though, as discussed above, other types of images as well as other types of seismic data are contemplated (e.g. pre-stack images with potentially hundreds of consecutive angle images). Further, 4D (time-lapse) seismic examines the changes between datasets acquired at different times over the same area. In this case, A represents a dataset collected at time $t_1$ and B represents a dataset collected at time $t_2$. A and B may also be collections of seismic images or volumes, such as a set of datasets $X_1, \ldots, X_N$ (e.g., pre-stack images).

In one or some embodiments, an unsupervised learning methodology, such as variational relation learning (VRL), is used to analyze changes between the two datasets. One goal of VRL is to learn a latent (e.g., hidden state) space Z representation that recognizes the relationship between A and B (termed a relational property), irrespective of the specific features of A and B (termed an absolute property). Various relational properties may be learned. One such relational property learned may comprise the AVO relationship. Other relational properties may be learned in addition to, or instead of, the AVO relationship.

VRL may result in one or more advantages. First, VRL may be trained without manually labeled examples (e.g., it is unsupervised). This is in contrast to typical seismic interpretation tasks, which rely on a large set of labeled training examples, and which is both labor-intensive or not practical due to the rarity of the feature (such as subtle anomalies). Second, VRL may be trained automatically without human intervention, thereby removing one of the bottlenecks of typical interpretation workflows, which is significant human intervention that both requires expensive human time cost and introduces human bias. Third, VRL may be applied to high-dimensional data. This is in contrast to typical workflows, which heavily depend on human intervention and depends on manually interpreting results on high dimensional data (which is a challenging task).

In this regard, using VRL results in one or more differences over typical methodologies. First, VRL is configured to discover new knowledge between two datasets (e.g., near-stack vs far-stack) via one or more learned relational properties. For example, when applying VRL to analyze AVO, the learned relational property may capture a form of the Zoeppritz equation, but further combined with geological features information captured by learned absolute property. Second, VRL has the capability to learn a set of disentangled information. For example, when applying VRL to analyze AVO, the learned relational property may capture amplitude information while the learned absolute property may capture structural information; furthermore, by VRL construction, the learned relational property may be independent of learned absolute property. Third, VRL has the ability to learn different relationships via analyzing the learned relational property.

Fourth, both the relational property and the absolute property learned by VRL may be represented by defined probability distributions and may be used to quantify anomalous features and quantitatively measure them. Fifth, the likelihood prediction learned by VRL may be used to map a given image $x_1$ to another image $x_2$ with a different relationship encoded by Z. Sixth, the learned relational property by VRL may introduce one or more new interpretation workflows that are significantly easier to analyze due to: much lower dimension latent space; and/or a restricted latent space meaning (e.g., only capturing relationship information). Seventh, VRL may include a data augmentation step, such as a relation-preserving data augmentation step, that may be included in the analysis (such as for AVO analysis). In this regard, the data augmentation step is tailored to the VRL in that it is directed to relation-preserving. Eighth, the relational property learned by relational learning may comprise a new type of attribute that may he used for the interpretation task. For example, the latent space Z learned by VRL may encode the amplitude information that can be used for AVO analysis.

One may observe a dataset $X=\{(a^{(i)}, b^{(i)})|i=1, \ldots, N\}$ comprising N independent and identically distributed samples (e.g., each data sample $(a^{(i)}, b^{(i)})$ is independently drawn from the same (identical) distribution) of data pairs that are generated from a joint distribution $p(a \in A, b \in B)$. In one or some embodiments, the methodology disclosed comprises a relational learning task of learning the relational property between $a^{(i)}$, and $b^{(i)}$ irrespective of their specific features (e.g., the absolute property). Furthermore, the methodology discovers the relationship pattern among X in an unsupervised fashion. In this regard, the methodology does not need labelled datasets, such as $\{(a^{(i)}, b^{(i)}, z^{(i)})|i\uparrow 1, \ldots, N\}$ where $z^{(i)}$ is a target variable indicating the relational property between $a^{(i)}$ and $b^{(i)}$. Further, the methodology does not need examples to be provided that have the same (or different) relational property, such as $(a^{(i)}, b^{(i)})$ has the same (or different) relational property as $(a^{(j)}, b^{(j)})$, $i \neq j$.

Further, unlike typical unsupervised learning methodologies, the disclosed unsupervised learning methodology may operate on X in one or both of the following ways: (1) the information in X is dissected into relational property and absolute property. In this regard, the relational property characterizes the relationship between $a^{(i)}$ and $b^{(i)}$ while the absolute property characterizes specific features that independently describe $a^{(i)}$ and $b^{(i)}$; and (2) the unsupervised learning methodology is focused on learning the relational property among X irrespective of its absolute property (e.g., learning a relational property is decoupled from learning the absolute property).

One challenge in learning a decoupled relational property is that it is an abstract feature. Unlike an absolute property, which is based on observed data and may be quantitatively measured, the relational property may be difficult to measure, particularly when the learning is unsupervised. One way to bypass this challenge is to assume dependencies between relational and absolute properties. Under this assumption, one may first learn a set of one or more absolute properties that are descriptive, and then infer one or more dependent relational properties from the previously learned one or more absolute properties. However, one premise underlying this methodology is that relational learning aims to learn a relational property that does not depend on absolute property. As discussed further below, the methodology may be directed to one or both of the following related problems: relational discrimination; and/or relational mapping. Relational discrimination enables differentiation of $(a^{(i)}, b^{(j)})$ from $(a^{(i)}, b^{(j)})$ based on their relational properties. On the other hand, relational mapping allows application of the relational property extracted from $(a^{(i)}, b^{(i)})$ to a different set of data, for example, deducing that d is related to c in the same way that $b^{(i)}$ is related to $a^{(i)}$.

The methodology disclosed herein is driven by one or both of the following: (1) dissecting information into decoupled relational and absolute property brings a unique perspective to the data analysis of X; and (2) applying relational learning to many different seismic interpretation tasks. For example, $(a^{(i)}, b^{(i)})$ may represent: near and far-stack images; dataset acquired at time/location i and j; thus, relational learning may be used in one, some or all of the above-described applications as well as other seismic analysis-related applications.

Thus, in one or some embodiments, the VRL methodology may address the relational learning problem. In a specific embodiment, VRL comprises at least two parts: first, adopting a directed graphical model, called a VRL model, such as illustrated in FIG. 3, to represent the relational learning problem; second, performing a relational learning task by running inference and learning with the VRL model.

Figure 3:
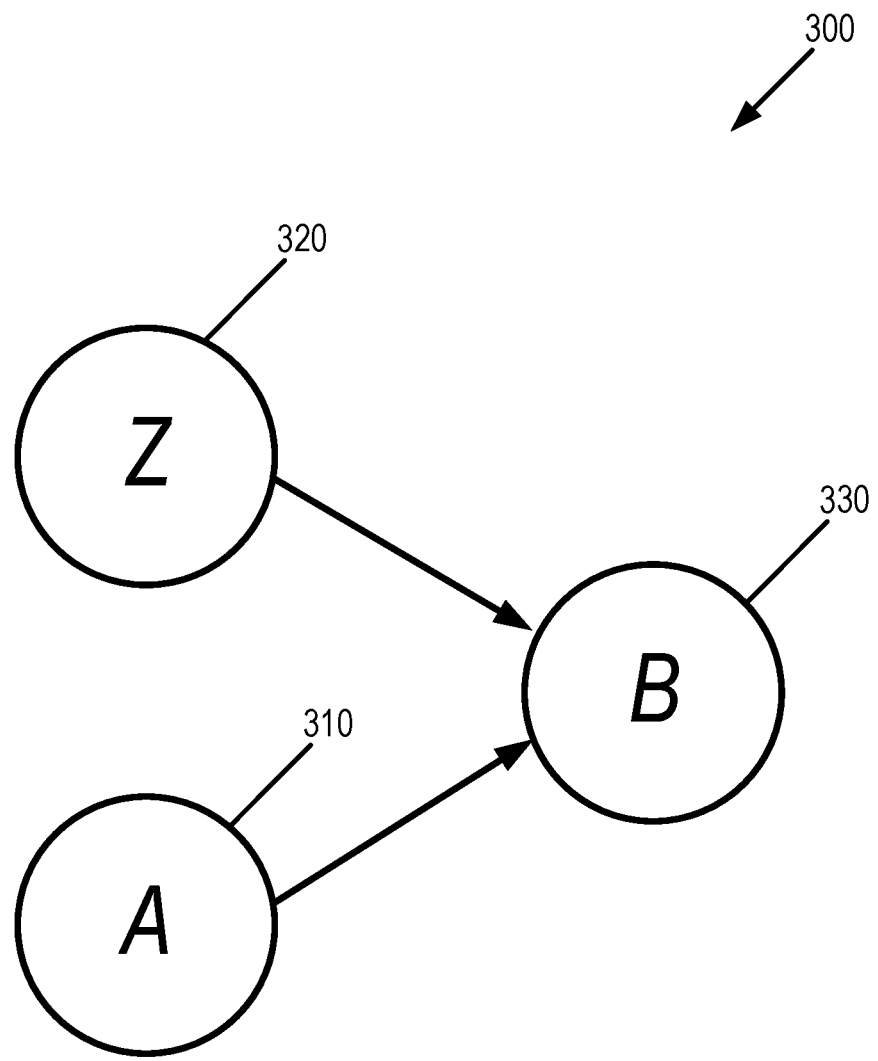
FIG. 3 shows a block diagram of a VRL model.

For example, the block diagram 300 in FIG. 3 may represent dataset A (310), dataset B (330), and latent space Z (320). The VRL model may generate data a (from dataset A (310)) and b (from dataset B (330)) by sampling from some random process involving an unobserved random variable z. First, a and z may be generated from some prior distributions (a) and p(z), respectively. Then, b may be generated from a conditional or likelihood distribution (b|a, z). One may assume that the priors (a), p(z), and the likelihood $p_\theta(b|a, z)$ come from parametric families of distributions, and that their probability density functions are differentiable almost everywhere with respect to θ, z, and a. Unfortunately, a lot of this process is hidden from view, so that, practically speaking, only a set of independent realizations $X=\{(a^{(i)}, b^{(i)})|i=1, \ldots, N\}$ is observed while the true parameters θ as well as the corresponding latent variables $z^{(i)}$ are unknown. One property of the VRL model is that a and z are independent but not conditionally independent given b (e.g., (a, z)=p(a)p_\theta(z), $p_\theta(a, z|b) \neq p_\theta(z|b)p_\theta(z|b)$).

Further, the following provides greater detail for the rationale in using VRL model to represent relational learning. First, as discussed above, two features define the relational learning problem including: (1) dissecting information into relational and absolute property; and (2) learning a relational property that is decoupled from the absolute property. By examining the likelihood function $p_\theta(b|a, z)$, one can view the absolute property as encapsulating the dependencies between b and a (e.g., information (features) in b that may be used to predict b) while the (abstract) relational property is represented by the latent variable z with the purpose of providing any additional information to fully characterize the variability in b. Conversely, the goal of learning a decoupled relational property (with respect to the absolute property) is achieved by VRL model construction where a, which the absolute property is derived from, and z, which represents the relational property, are independent of one another. Having established the VRL model, one learning objective then is to approximate (b|a, z) and p(z|a, b). It is noted that by observing b, z is no longer independent from a. Learning the posterior $p_\theta(z|a, b)$ may be useful for the relational inference task where one may infer the relational property z for a given a and b; moreover, it serves as a basis for relational discrimination task where comparing the relational property between different datasets. Learning the likelihood prediction for b given a and z allows for performing the relational mapping task where one may apply the relationship between $(a^{(i)}, b^{(i)})$ to $a^{(j)}$ and find the corresponding $b^{(j)}$.

The parameter θ may be estimated in one of several ways. In one way, the parameter θ is estimated for (b|a, z) by following the principle of maximum-likelihood. To approximate the posterior, the variational Bayesian approach may be taken and the unknown (and often intractable) posterior $p_\theta(z|a, b)$ is approximated, with a variational distribution $q_\phi(z|a, b)$ (parametrized by ϕ) by optimizing the following variational lower bound:

$$\tilde{L}(\theta, \phi; a^{(i)}, b^{(i)}) = \qquad (3)$$

$$\frac{1}{L}\sum_{i=1}^{L}\log p_\theta(b^{(i)} \mid a^{(i)}, z^{(i,l)}) + \log p_\theta(z^{(i,l)}) - \log q_\phi(z^{(i,l)} \mid a^{(i)}, b^{(i)}),$$

$$\text{where } z^{(i,l)} = g(\epsilon^{(i,l)}, a^{(i)}, b^{(i)}, \phi) \text{ and } \epsilon^{(i,l)} \sim p(\epsilon),$$

where g is a differentiable and invertible transformation, p(ϵ) is a predetermined distribution from which to sample, and ϵ is independent of a, b, and ϕ. There may generally be challenges with maximizing a variational lower bound using stochastic optimization; however, VRL brings additional unique challenges to the optimization problem. As such, one or both of the following approaches may address the optimization challenges. In the first approach, regularization may be added to the latent variable z to impose a strong regularization. As one example, one or more functions, such as a Gaussian distribution may be chosen to impose regularization. In a specific example, a centered isotropic multivariate Gaussian with a small variance, $p_\theta(z) \sim N(z; 0, \sigma \cdot I)$ with $\sigma << 1$ may be selected. In the second approach, a data-augmentation strategy tailored to VRL may be used. As one example, relation preserving data-augmentation (RPDA) may be used, such as by constructing a set of data-augmentation functions D={(a, b; i)i∈I (some index set), d: A×B→A×B} that preserves relationships between a and b in the sense that $p_\theta(z|a, b) = p_\theta(z|a', b')$ where a', b'=d(a, b; i), ∀i. Assuming access to D, the variational lower bound may be rewritten as:

$$\tilde{L}(\theta, \phi; a^{(i)}, b^{(i)}) = \qquad (4)$$

$$\frac{1}{L}\sum_{i=1}^{L}\log p_\theta(b^{(i)} \mid a^{(i)}, z^{(i,l)}) + \log p_\theta(z^{(i,l)}) - \log q_\phi(z^{(i,l)} \mid a'^{(i)}, b'^{(i)}),$$

$$\text{where } z^{(i,l)} = g(\epsilon^{(i,l)}, a^{(i)}, b^{(i)}, \phi)a'^{(i)},$$

$$b'^{(i)} = d_i(a^{(i)}, b^{(i)}; i)\epsilon^{(i,l)} \sim p(\epsilon), d_i \sim U(D)$$

Finally, the gradient may be taken of the above lower bound using, for example, backpropagation, and the parameters θ and ϕ may be updated with stochastic gradient descent (SGD) method.

As discussed above, various applications of VRL are contemplated. As one example, VRL may be applied to AVO analysis. In one or some embodiments, AVO analysis is directed to the relative amplitude changes between near-offset a and far-offset b, but not necessarily the features themselves in a and b. The VRL methodology described above may be used to learn a latent space z that captures the one or more relational properties that characterize the amplitude changes between a and b irrespective of their absolute property. The relational property learned by VRL is a new attribute that may be used for the AVO interpretation task.

Figure 4:
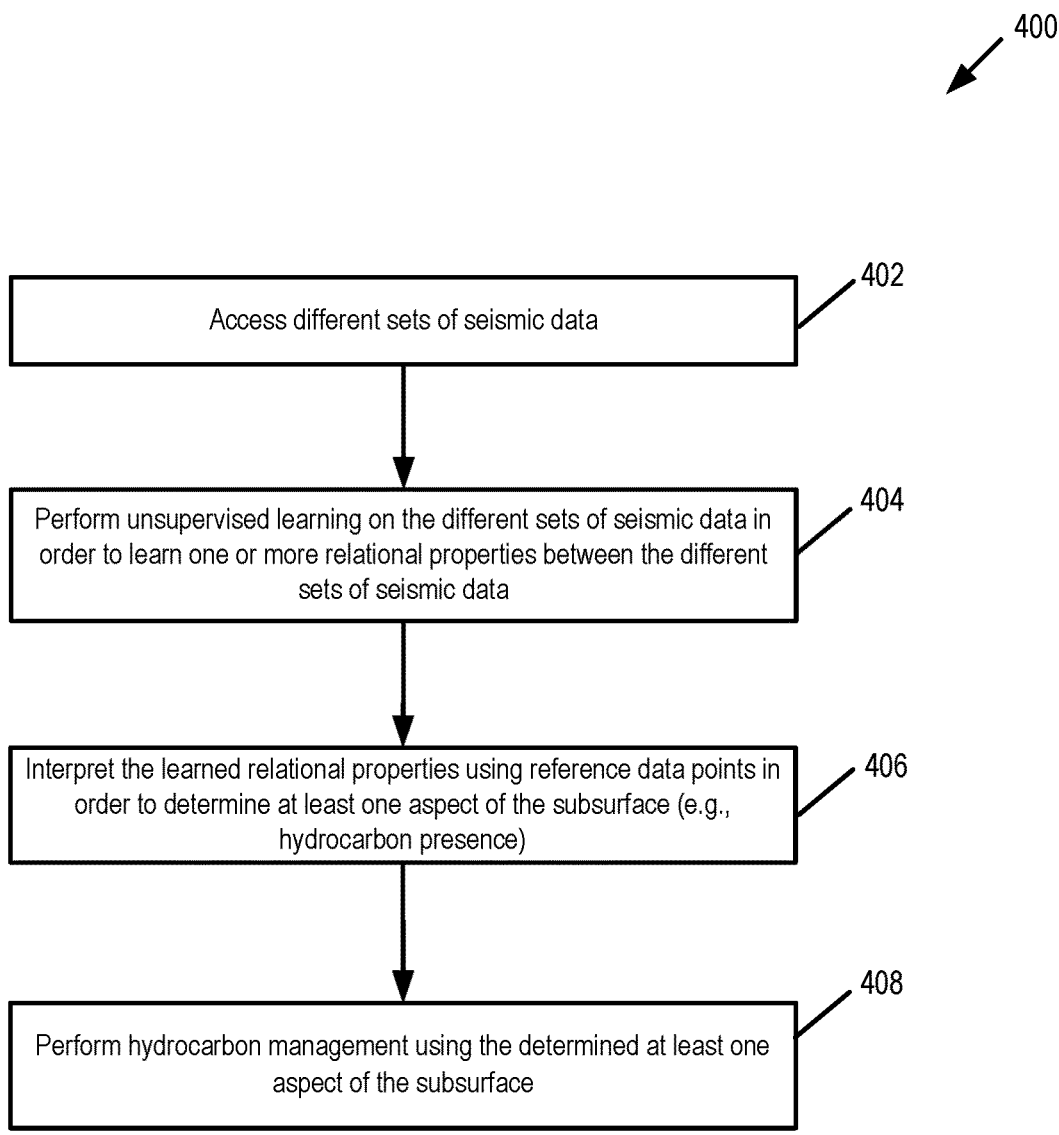
FIG. 4 is a flow chart for using unsupervised learning to learn one or more relational properties and to use the learned one or more relational properties.

FIG. 4 is a flow chart 400 for using unsupervised learning to learn one or more relational properties and to use the learned one or more relational properties. At 402, different sets of seismic data are accessed. As discussed above, the different sets may be obtained at different times and/or different locations. At 404, unsupervised learning is performed on the different sets of seismic data in order to learn one or more relational properties between the different sets of seismic data. At 406, the learned one or more relational properties are interpreted using reference data points in order to determine at least one aspect of the subsurface (e.g., hydrocarbon presence). At 408, hydrocarbon management is performed using the determined aspect of the subsurface.

Figure 5:
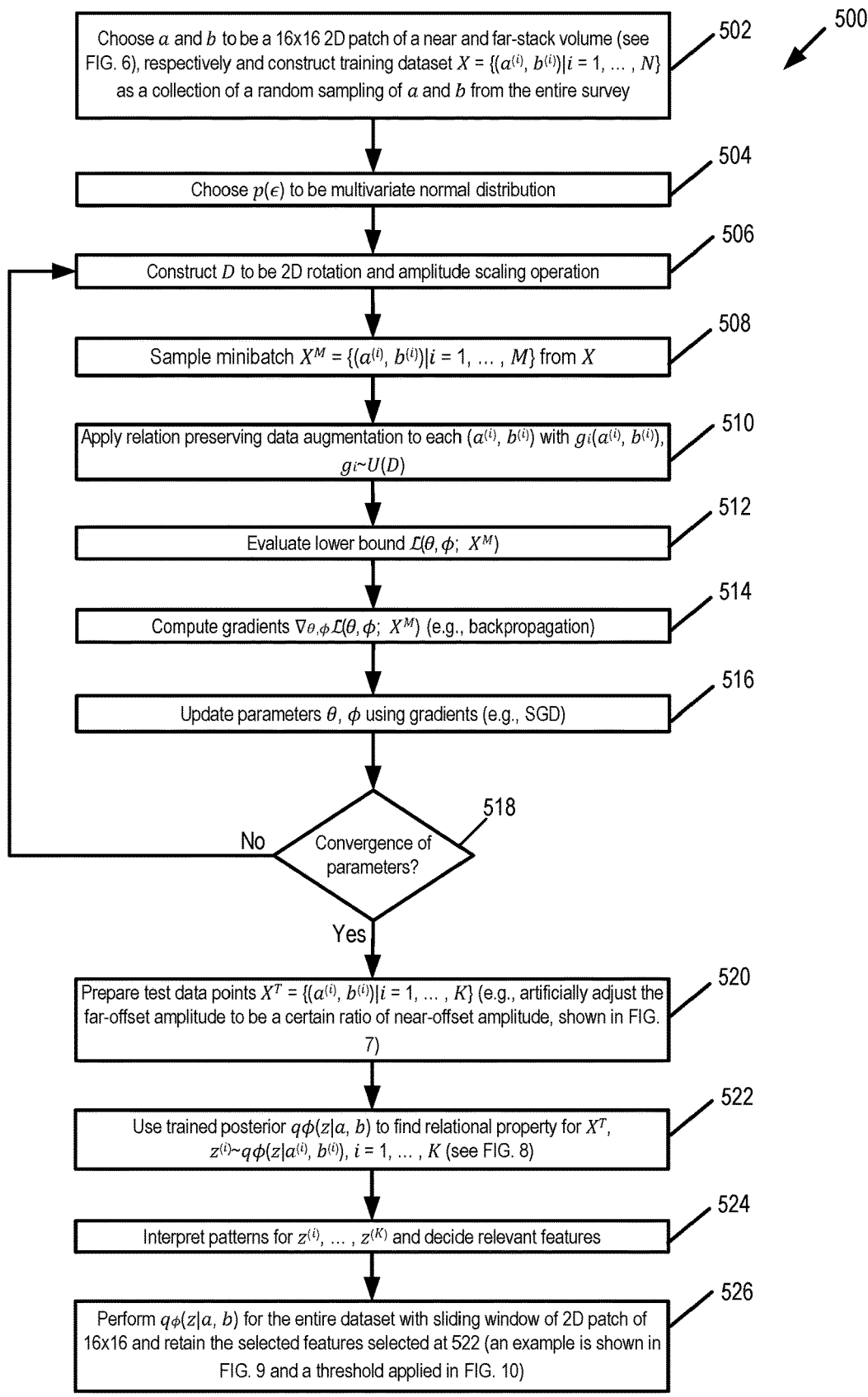
FIG. 5 is a flow chart applying VRL to AVO analysis.
Figure 6:
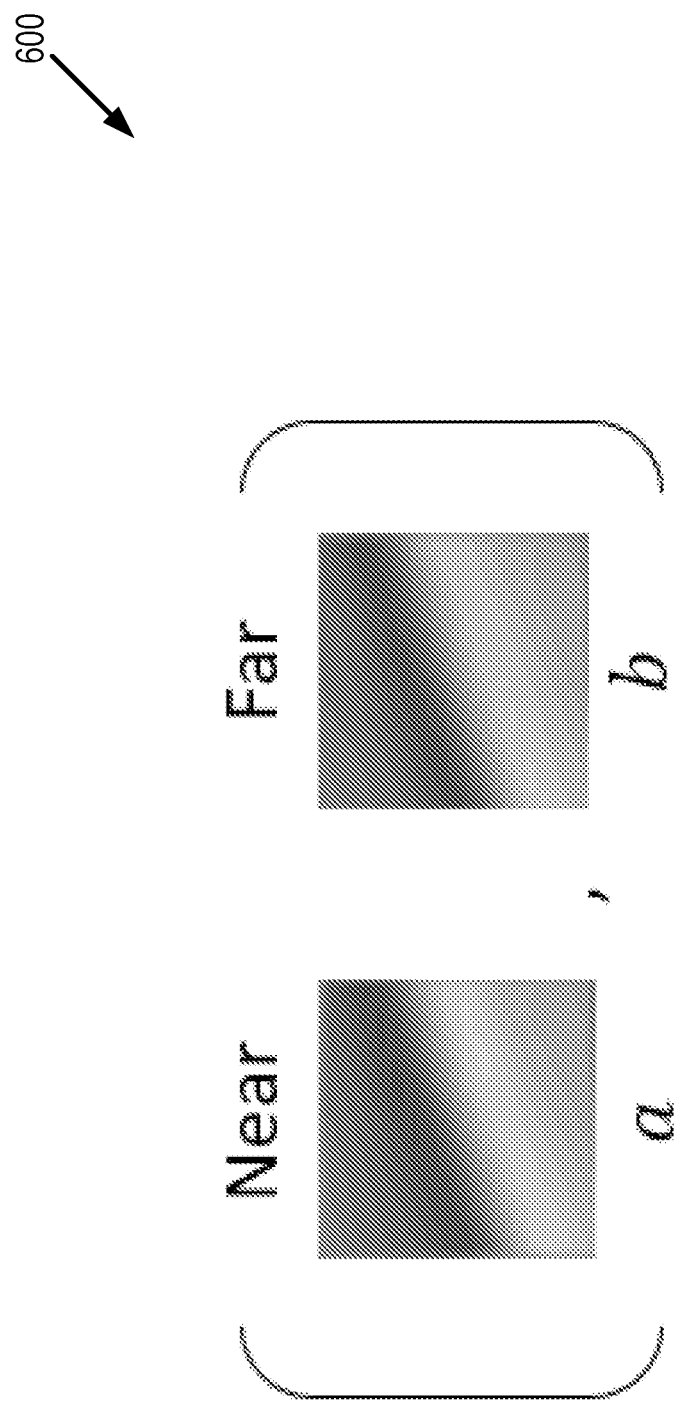
FIG. 6 is an illustration of an x-slice for a near- and far-stack volume.

FIG. 5 is a more detailed flow chart 500, applying VRL to AVO analysis. As discussed above, the data may be accessed. For example, at 502, a and b are chosen to be a 16×16 2D patch of a near and far-stack volume (see illustration 600 in FIG. 6), respectively and construct training dataset X={($a^{(i)}$, $b^{(i)}$)|i=1, . . . , N} as a collection of a random sampling of a and b from the entire survey.

At 504, (ϵ) is chosen to be multivariate normal distribution. As discussed above, regularization may be used, such as imposing one or more limits, including imposing a defined function. Various functions are contemplated, with the various functions having associated different shapes. As one example, a Normal or Gaussian distribution may be used. In one or some embodiments, the selection of the function may be dependent on the desired analysis (e.g., a certain function may be selected for AVO analysis, whereas another function may be selected for a different analysis). Alternatively, the selection of the function may be independent of the desired analysis.

Further, in one or some embodiments, the selection of the function may be iterative. As one example, an initial distribution may be selected for regularization. Thereafter, based on subsequent analysis, such as based on whether convergence has occurred, an updated distribution may be selected for regularization.

In this regard, (ϵ) may be used, in effect, as a helper function, with the distribution selected for (ϵ) that may be easy from which to sample. As one example, an optimization problem may be the focus with regard to (z). As another example, (b|a, z) may be the focus of regularization. The initial selection of the distribution (such as a single Gaussian distribution) may not adequately cover the z space (e.g., the hidden space). Thereafter, a different distribution may be selected (such as a mixture of Gaussian distributions) in order to compensate for the initial selection. The iterative process, via flow chart 500 looping back, may thus provide flexibility to expand on or correct the initially assumed distribution.

At 506, D is constructed to be a 2D rotation and amplitude scaling operation (e.g., D={(a, b; i), Amp(a, b; j)|i∈[0,360), j∈[−2, 2]} where Rot(a, b; i) rotate both a, b by degrees i (along random axis), and Amp(a, b; j) scales both a, b by factor j. At 508, minibatch $X^M$={($a^{(i)}$, $b^{(i)}$)|i=1, . . . , M} is sampled from X. At 510, relation preserving data augmentation is applied, such as to each ($a^{(i)}$, $b^{(i)}$) with gi($a^{(i)}$, $b^{(i)}$), gi∼U(D). For example, in one or some embodiments, the application may focus on one aspect of the dataset. In this regard, relation preserving data augmentation may preserve the desired aspect(s) of the dataset. Example aspects include: amplitude; and/or frequency. With regard to amplitude information, it may be desired to preserve amplitude variation when rotating the image. So that, the learning algorithm may be rotationally invariant (e.g., insensitive to the rotations of the image) and/or frequency independent.

In particular, at 506, D is constructed to be a 2D rotation and amplitude scaling operation. Thus, at 506, not only is rotation performed, but amplitude scaling as well (even though rotating does not modify amplitude). If the focus is amplitude invariance, one may question why amplitude scaling is performed; however, this manner of scaling preserves the differential information (or the relational information).

At 512, the lower bound $\tilde{L}$ (θ, ϕ; $X^M$) is evaluated. At 514, gradients $\nabla_{\theta\phi}\tilde{L}$ (θ, ϕ; $X^M$) are computed (e.g., by backpropagation). At 516, one or more parameters, such as one or both of θ, φ, are updated, such as by using gradients (e.g., using the stochastic gradient descent method or other optimization methodology). At 518, it is determined whether one, some, or all of the one or more parameters has converged. If not, flow chart 500 loops back to 506. If so, flow chart 500 proceeds to 520.

512, 514, 516, 518 may be viewed as the machine learning training steps (such as learning the posterior distribution). Though, it is contemplated that there are many variations with regard to these steps. Moreover, evaluating a bound, such as a lower bound, assists in the machine learning training process (e.g., even though the entire relation matching function may not be determined, a part of the relation matching function, such as the lower bound, may be determined). Other constraints, separate from 512, may be placed, such as in 504 (e.g., in the form of the multivariate normal distribution). Further, the calculations of the absolute posterior distributions (e.g., the difference between the two different distributions) may be challenging since the samples are available, but the function may not (but may be assumed, such as at 504). In this regard, given the limited number of samples available, constraining the entire distribution may not be possible. Instead, the lower bound may be used as a constraint. As discussed above, different functions may have different lower bounds (e.g., different functions assumed in 504 may result in different lower bounds evaluated at 512). Convergence at 518 may be determined in one of several ways, including by maximizing the lower bound. In the event that the lower bound cannot be maximized, flow chart 500 may iterate, such as back to 506 in order to choose one or more other parameters (e.g., the shape chosen for (ϵ) may be too complex or too simple so that another shape is chosen for the iteration).

Figure 7:
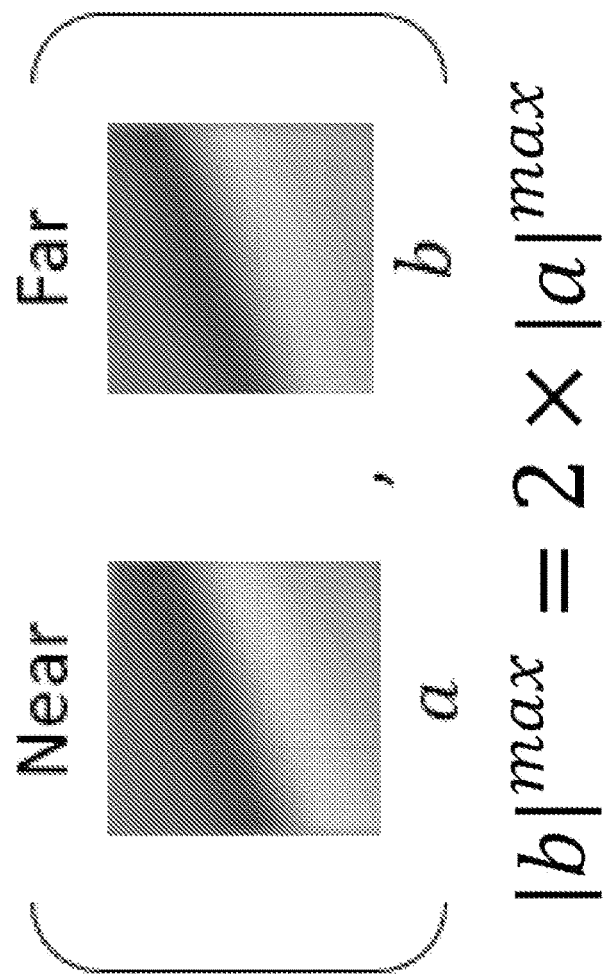
FIG. 7 is an illustration of preparing test data points for latent space interpretation.

At 520, test data points $X^T = \{(a^{(i)}, b^{(i)}) | i=1, \ldots, K\}$ may be prepared. For example, a section of the data may be modified, such as by artificially adjusting the far-offset amplitude to be a certain ratio of near-offset amplitude, such as shown in the illustration 700 in FIG. 7. After 518, machine learning training may be done so that one or more functions are determined. However, the relational properties are not yet determined (e.g., unsupervised machine learning is performed on the raw data to extract one or more relational properties of the raw data; after 518, the methodology has learned one or more attributes, after which the learned attributes may be used to represent properties of data). 520 represents one example of interpreting/understanding the learned attributes. Thus, in one or some embodiments, in order to interpret/understand the learned attributes, known datapoints (e.g., points where the desired properties are known in the 2D latent space) may be used. In a specific embodiment, the known datapoints may be synthetically generated data. Alternatively, or in addition, the known datapoints may comprise real data. In this way, even with a small amount of data, the function(s) learned via unsupervised machine learning may be used to map the known datapoints onto the latent space to examine the spread of the data, thereby providing an understanding what the machine learning algorithm has learned.

In one or some embodiments, the unsupervised machine learning model, used to learn the one or more attributes, may be paired with another machine learning model (such as a supervised machine learning model), so that the supervised machine learning model does not operate on the data itself, but on the learned one or more attributes. In this way, the unsupervised machine learning model may be used to train another model, which can map from the latent space to some desired end space (e.g., detection of hydrocarbon indicators).

Figure 8:
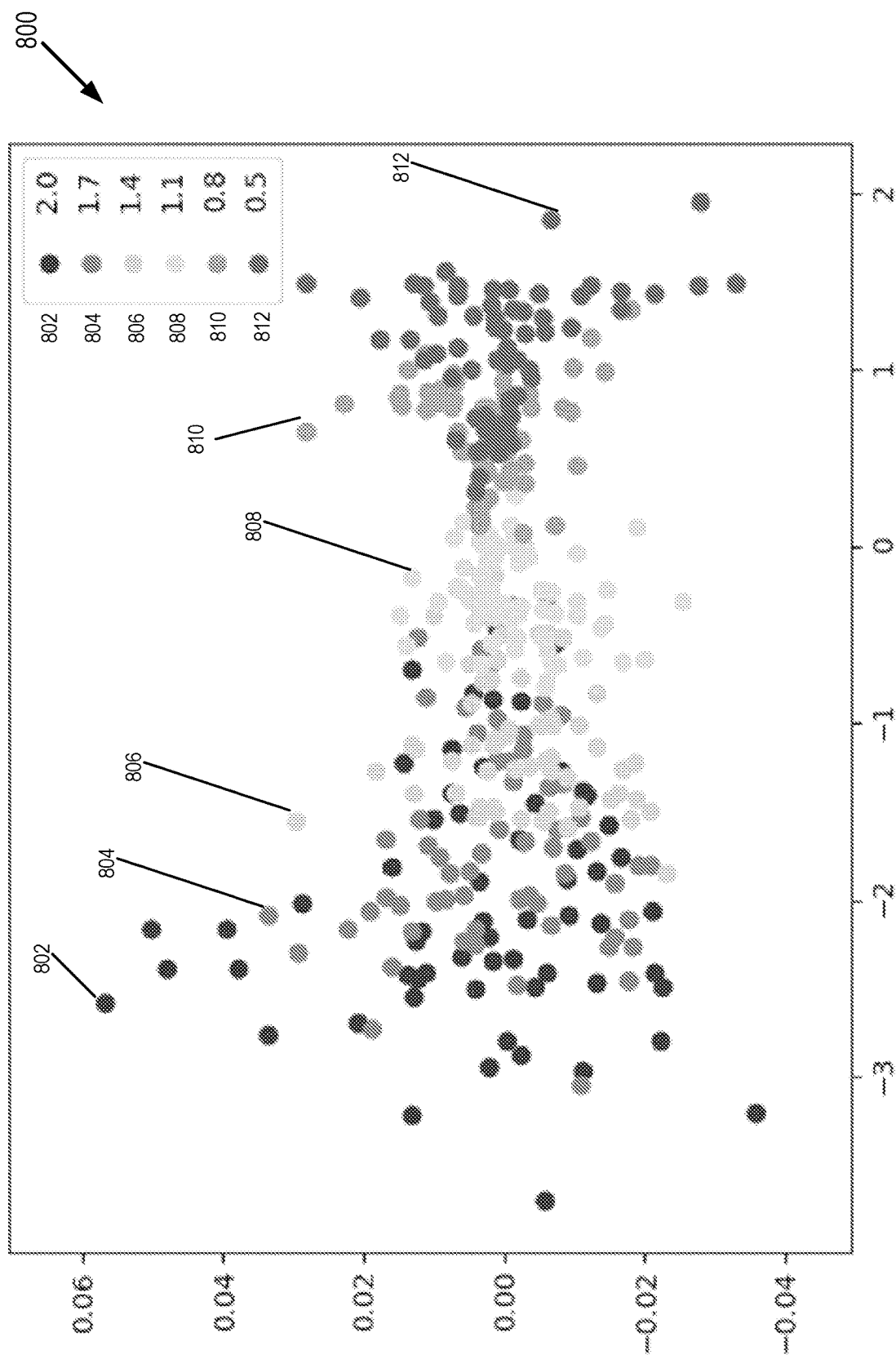
FIG. 8 is a graph of the relational property (latent space z) of the test data points.

At 522, the trained posterior (z|a, b) is used to find relational property for $X^T$, $^{(i)} \sim q\phi(z|a^{(i)}, b^{(i)})$, i=1, ..., K. One example of this is illustrated in the graph 800 in FIG. 8, showing different relational property values 802, 804, 806, 808, 810, 812. At 524, patterns for $\{z^{(i)}, \ldots, z^{(K)}\}$ are interpreted and relevant features determined. As one example, $z_1$ dimension of the latent space may capture amplitude information. Other relevant features are contemplated.

Thus, FIG. 8 represents a scatter plot based on the prepared data points, which provides an understanding of what relationship has been learned (e.g., visual patterns may be identified in the scatter plot, with those patterns used to extract information from other parts of the raw data (image)). For example, in terms of colors in the scatter plot, data points identified as having a specific color (e.g., dark shades in grayscale color values, such as 802) can be used to construct other parts of the data that are the same specific color as well.

Figure 9B:
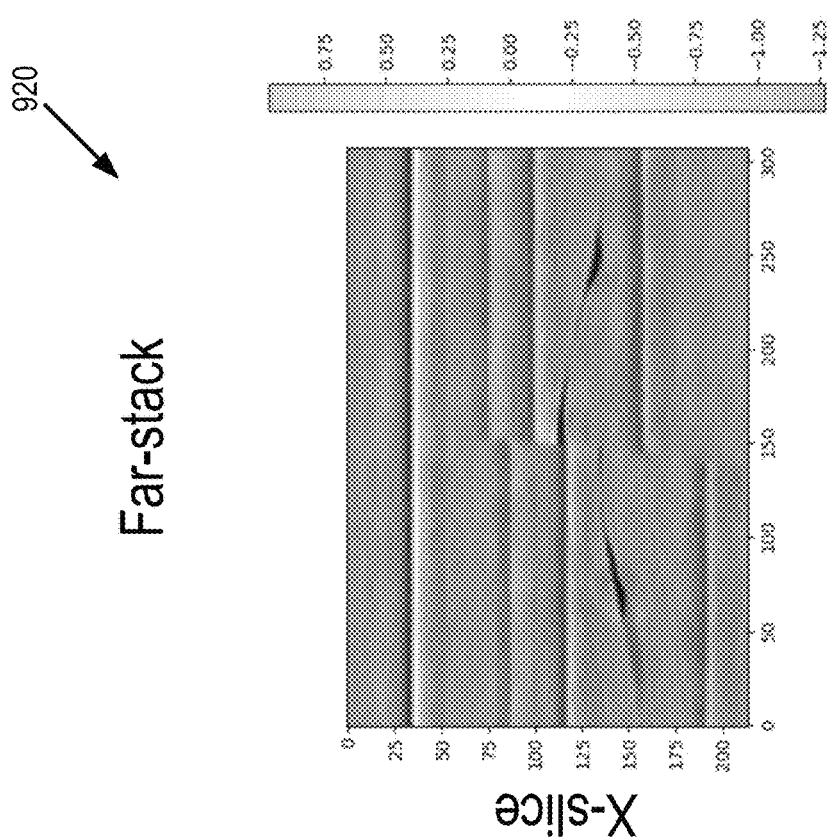
FIG. 9A and FIG. 9B illustrate the relational property of x-slice cross-sections for near-stack (FIG. 9A) and far-stack (FIG. 9B) of a seismic survey, color map represents the intensity of z.
Figure 9A:
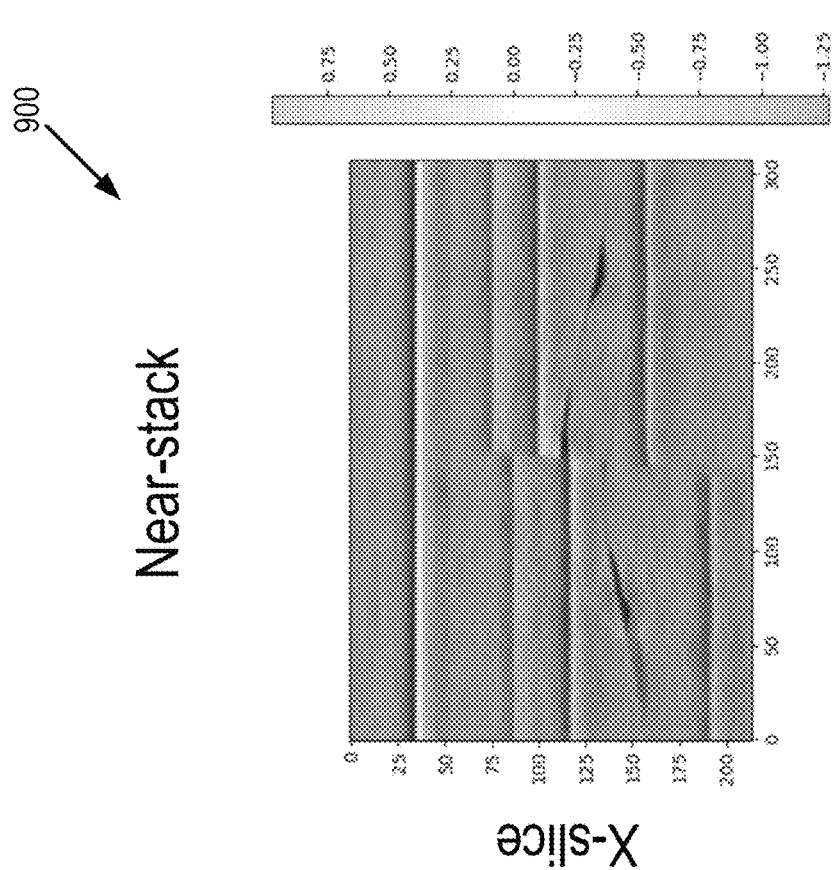
Figure 9D:
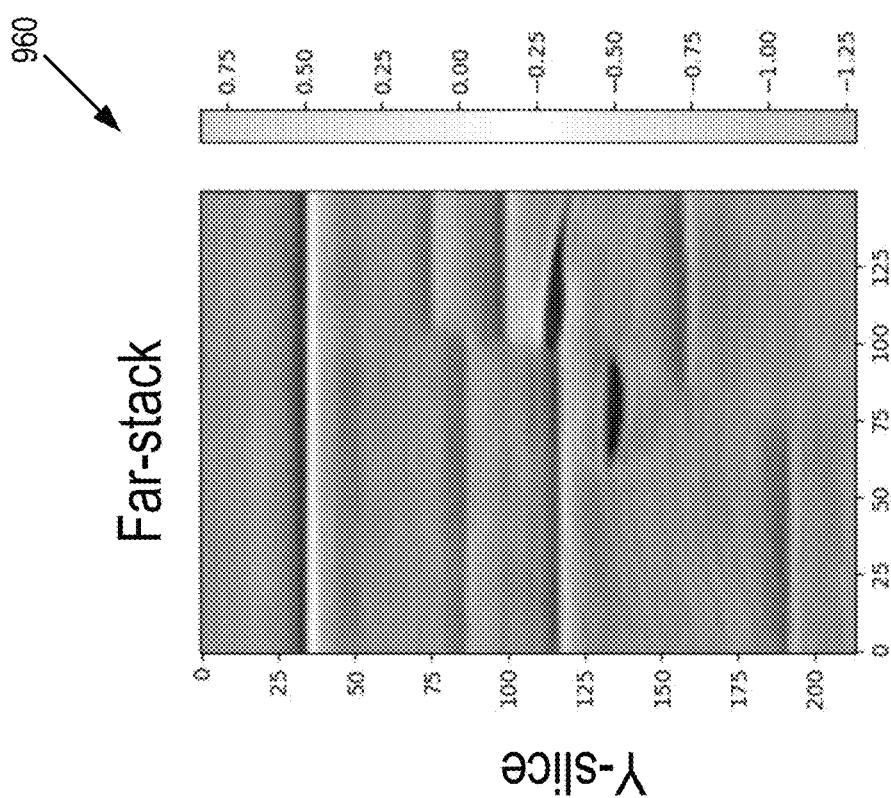
FIG. 9C and FIG. 9D illustrate the relational property of y-slice cross-sections for near-stack (FIG. 9C) and far-stack (FIG. 9D) of a seismic survey, color map represents the intensity of z.
Figure 9C:
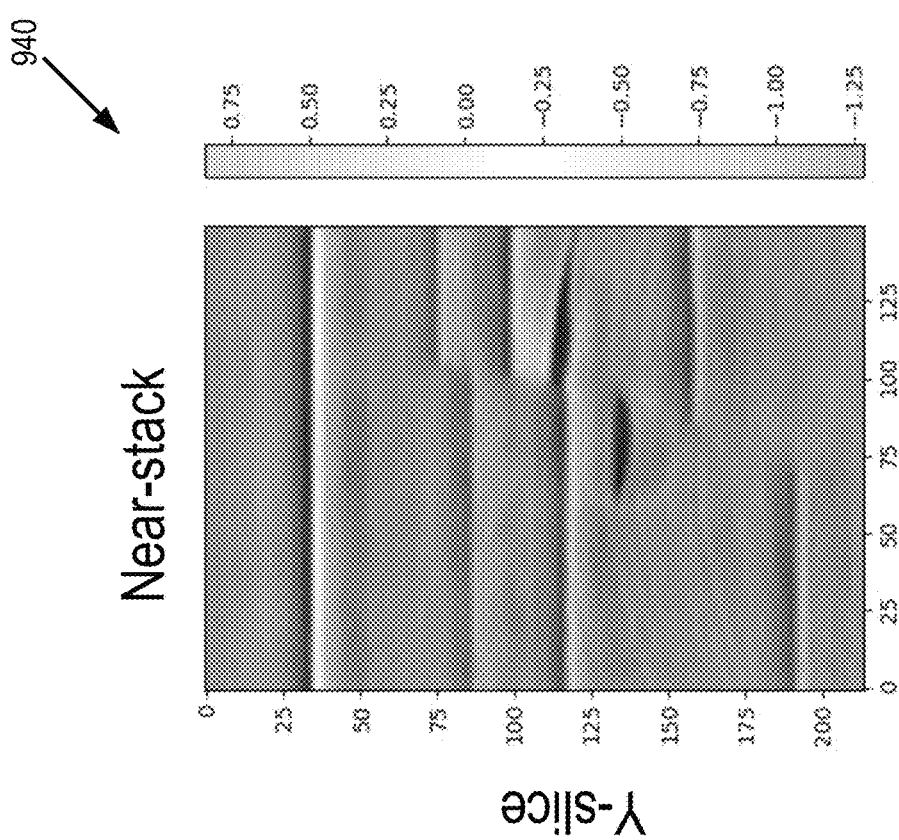
Figure 10A:
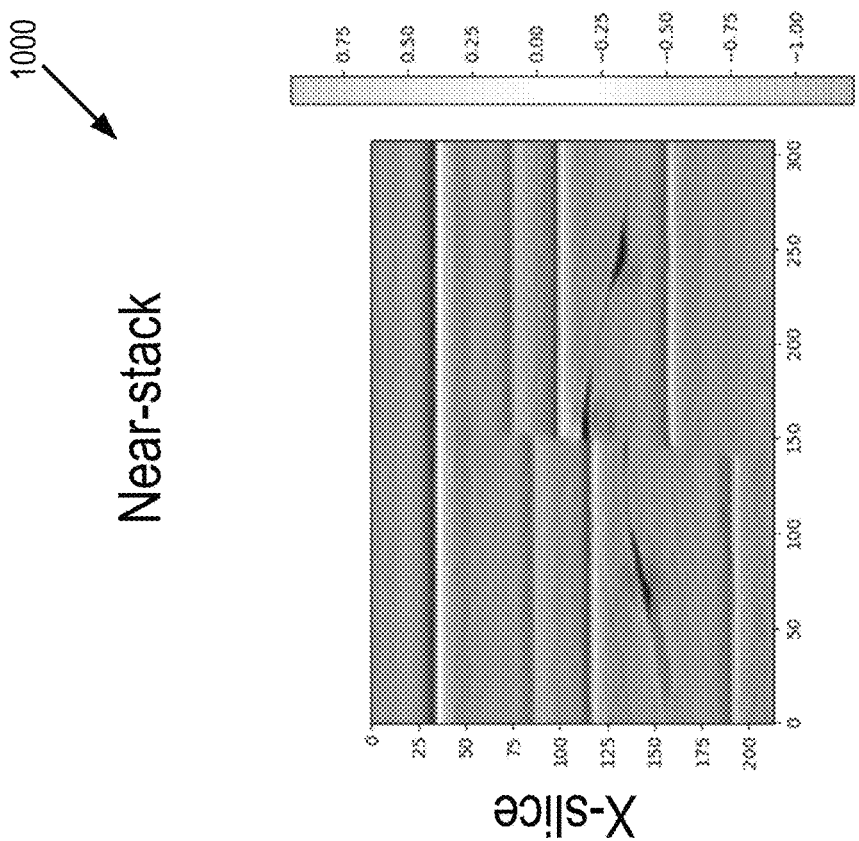
FIG. 10A and FIG. 10B illustrate the threshold applied to FIG. 9A and FIG. 9B for the x-slice cross-sections for near-stack (FIG. 10A) and far-stack (FIG. 10B) with retaining negative $z_1$ relational property.
Figure 10B:
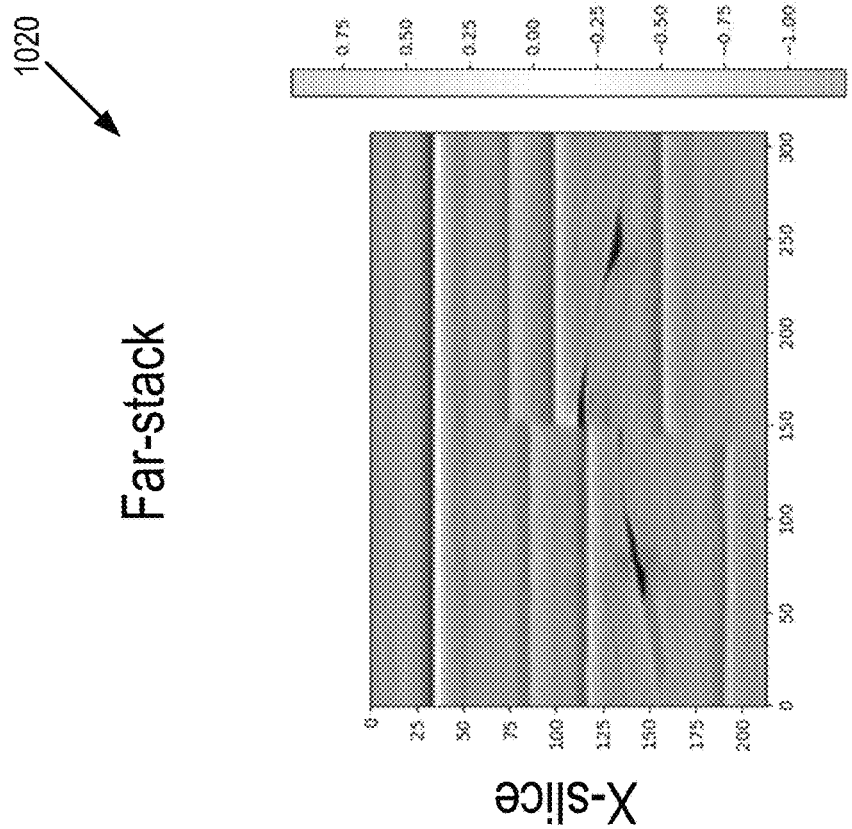
Figure 10D:
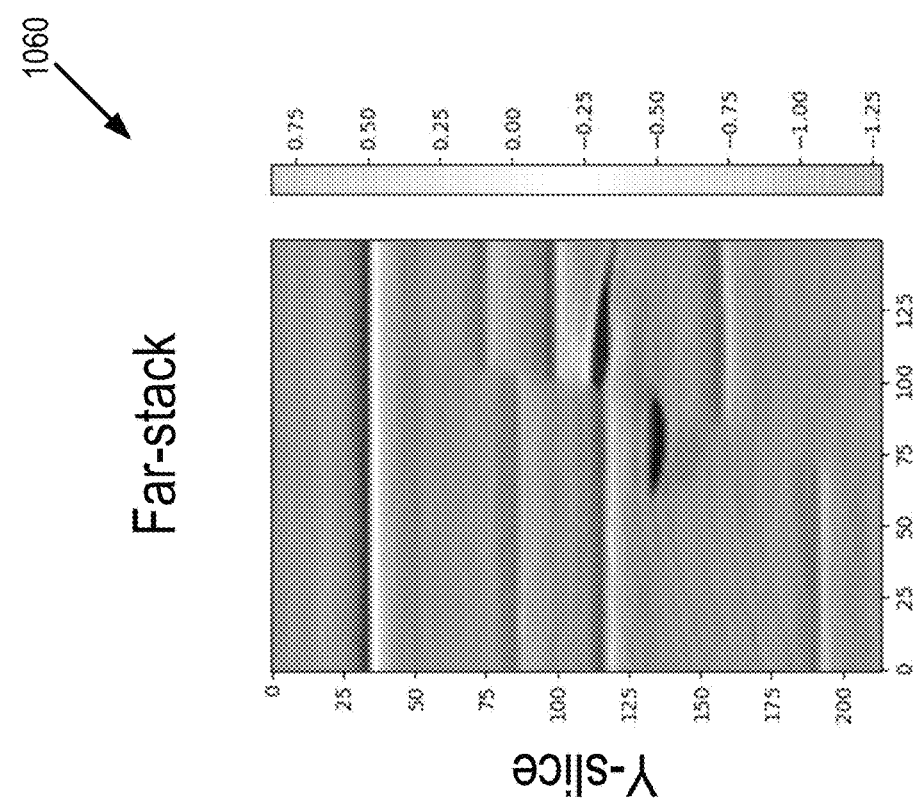
FIG. 10C and FIG. 10D illustrate the threshold applied to FIG. 9C and FIG. 9D for the y-slice cross-sections for near-stack (FIG. 10C) and far-stack (FIG. 10D) with retaining negative $z_1$ relational property.
Figure 10C:
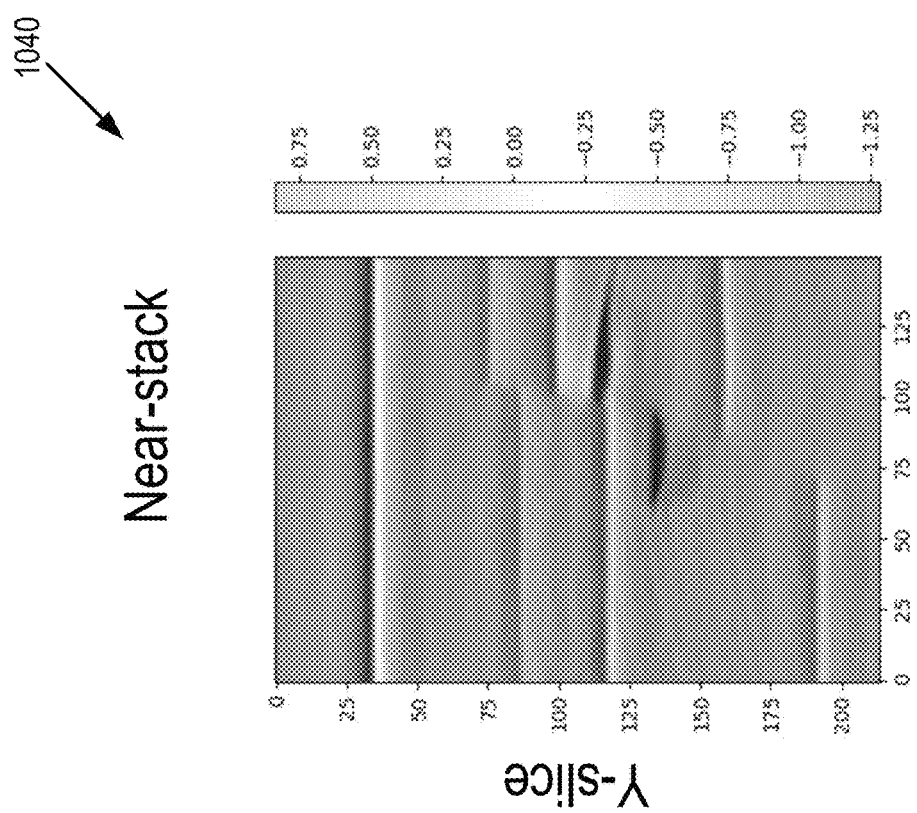

At 526, (z|a, b) is performed for the entire dataset with sliding window of 2d patch of 16×16 and retain the selected features found at 522. An example of the relational property is illustrated in FIGS. 9A-D and a threshold applied to FIGS. 9A-D is illustrated in FIGS. 10A-D. In particular, FIGS. 9A-B illustrate the relational property of x-slice cross-sections for near-stack (900 in FIG. 9A) and far-stack (920 in FIG. 9B) of a seismic survey, color map represents the intensity of z. FIGS. 9C-D illustrate the relational property of y-slice cross-sections for near-stack (940 in FIG. 9C) and far-stack (960 in FIG. 9D) of a seismic survey, color map represents the intensity of z. FIGS. 10A-B illustrate the threshold applied to FIGS. 9A-B for the x-slice cross-sections for near-stack (1000 in FIG. 10A) and far-stack (1020 in FIG. 10B) with retaining negative $z_1$ relational property. And, FIGS. 10C-D illustrate the threshold applied to FIGS. 9C-D for the y-slice cross-sections for near-stack (1040 in FIG. 10C) and far-stack (1060 in FIG. 10D) with retaining negative $z_1$ relational property.

Figure 11:
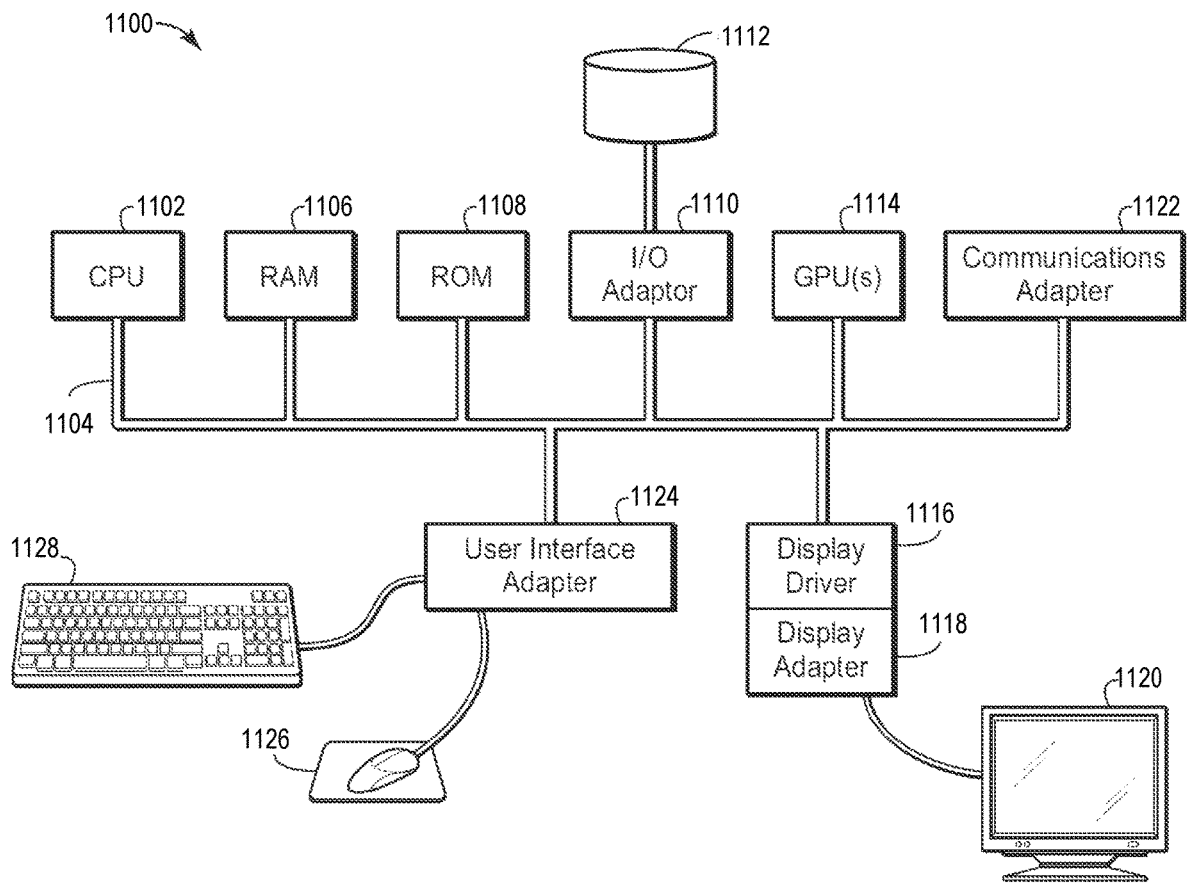
FIG. 11 is a diagram of an exemplary computer system that may be utilized to implement the methods described herein.

In all practical applications, the present technological advancement must be used in conjunction with a computer, programmed in accordance with the disclosures herein. For example, FIG. 11 is a diagram of an exemplary computer system 1100 that may be utilized to implement methods described herein. A central processing unit (CPU) 1102 is coupled to system bus 1104. The CPU 1102 may be any general-purpose CPU, although other types of architectures of CPU 1102 (or other components of exemplary computer system 1100) may be used as long as CPU 1102 (and other components of computer system 1100) supports the operations as described herein. Those of ordinary skill in the art will appreciate that, while only a single CPU 1102 is shown in FIG. 11, additional CPUs may be present. Moreover, the computer system 1100 may comprise a networked, multi-processor computer system that may include a hybrid parallel CPU/GPU system. The CPU 1102 may execute the various logical instructions according to various teachings disclosed herein. For example, the CPU 1102 may execute machine-level instructions for performing processing according to the operational flow described.

The computer system 1100 may also include computer components such as non-transitory, computer-readable media. Examples of computer-readable media include computer-readable non-transitory storage media, such as a random access memory (RAM) 1106, which may be SRAM, DRAM, SDRAM, or the like. The computer system 1100 may also include additional non-transitory, computer-readable storage media such as a read-only memory (ROM) 1108, which may be PROM, EPROM, EEPROM, or the like. RAM 1106 and ROM 1108 hold user and system data and programs, as is known in the art. The computer system 1100 may also include an input/output (I/O) adapter 1110, a graphics processing unit (GPU) 1114, a communications adapter 1122, a user interface adapter 1124, a display driver 1116, and a display adapter 1118.

The I/O adapter 1110 may connect additional non-transitory, computer-readable media such as storage device(s) 1112, including, for example, a hard drive, a compact disc (CD) drive, a floppy disk drive, a tape drive, and the like to computer system 1100. The storage device(s) may be used when RAM 1106 is insufficient for the memory requirements associated with storing data for operations of the present techniques. The data storage of the computer system 1100 may be used for storing information and/or other data used or generated as disclosed herein. For example, storage device(s) 1112 may be used to store configuration information or additional plug-ins in accordance with the present techniques. Further, user interface adapter 1124 couples user input devices, such as a keyboard 1128, a pointing device 1126 and/or output devices to the computer system 1100. The display adapter 1118 is driven by the CPU 1102 to control the display on a display device 1120 to, for example, present information to the user such as subsurface images generated according to methods described herein.

The architecture of computer system 1100 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 1100 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed.

Embodiment 1. A computer-implemented method for detecting geological elements or fluid in a subsurface from seismic images, the method comprising: accessing different sets of seismic data; performing unsupervised machine learning on the different sets of seismic data in order to learn one or more relational properties between the different sets of seismic data; interpreting the one or more relational properties using reference data points to identify one or both of the geological elements or the fluid; and performing one or more actions in the subsurface based on the identified one or both of the geological elements or fluid.

Embodiment 2. The method of Embodiment 1, wherein the unsupervised machine learning comprises variational machine learning (VRL).

Embodiment 3. The method of Embodiment 1 or 2, wherein the one or more relational properties are directed to amplitude changes with offset or angle (AVO or AVA) so that the one or more relational properties capture a form of Zoeppritz equation but further combined with geological features information captured by one or more absolute properties.

Embodiment 4. The method of any one of Embodiments 1-3, wherein applying the VRL to analyze AVO or AVA results in the one or more relational properties capturing amplitude information while the one or more absolute properties capturing structural information, with the one or more relational properties being independent of the one or more absolute properties.

Embodiment 5. The method of any one of Embodiments 1-4, wherein the different sets of seismic data comprise different sets of seismic images; wherein data a and b are generated by randomly sampling patches from the different sets of seismic stack images involving an unobserved random variable z; wherein a and z are generated from prior distributions $p_\theta(a)$ and $p_\theta(z)$, respectively; wherein b is generated from a conditional distribution $p_\theta(b|a, z)$; wherein the VRL further generates variational distribution $q_\phi(z|a, b)$; and wherein learning the one or more relational properties comprises learning model parameters θ and φ by optimizing a loss functional.

Embodiment 6. The method of any one of Embodiments 1-5, wherein the model parameter θ for $p_\theta(b|a, z)$ is estimated by following a principle of maximum-likelihood.

Embodiment 7. The method of any one of Embodiments 1-6, further comprising relation-preserving data augmentation.

Embodiment 8. The method of any one of embodiments 1-7, wherein the relation-preserving data augmentation comprises one or more functions that are invariant to a relationship between a and b, including one or both of random rotation or random amplitude scaling.

Embodiment 9. The method of any one of Embodiments 1-8, wherein the optimization of the loss functional comprises maximization of a variational lower bound functional.

Embodiment 10. The method of any one of Embodiments 1-9, wherein the optimization of the loss functional comprises additional regularization terms on the model parameters θ and φ), including weight decaying and Tikhonov type regularizations.

Embodiment 11. The method of any one of Embodiments 1-10, wherein the optimization of the loss functional comprises additional regularization terms on (b|a, z), including a generative adversarial network based penalties.

Embodiment 12. The method of any one of Embodiments 1-11, wherein $p_\theta(b|a, z)$ is represented by one or more parametric functions including one or more neural networks.

Embodiment 13. The method of any one of Embodiments 1-12, wherein the one or more neural networks comprise an autoencoder with a latent space augmented with z.

Embodiment 14. The method of any one of Embodiments 1-13, wherein (z|a, b) is represented by one or more parametric functions, including one or more neural networks.

Embodiment 15. The method of any one of Embodiments 1-14, wherein the one or more neural networks comprise a multi-layer convolution network that takes a, b as input and outputs z.

Embodiment 16. The method of any one of Embodiments 1-15, further comprising computing the distributions of the one or more relational properties over the entire stack images; and wherein detecting the hydrocarbon presence is based on the distributions of the one or more relational properties.

Embodiment 17. The method of any one of Embodiments 1-16, wherein identifying one or both of the geological elements or the fluid comprises detecting hydrocarbon presence; and wherein performing the one or more actions in the subsurface comprises performing hydrocarbon management using the detected hydrocarbon presence.

Embodiment 18. The method of any one of Embodiments 1-17, wherein identifying one or both of the geological elements or the fluid comprise determining presence of sand.

Embodiment 19. The method of any one of Embodiments 1-18, wherein the different sets of seismic data comprise different sets of seismic images; and wherein the one or more relational properties are used in their raw form to find patches that have one or more similar or different relational properties by comparing Euclidean distance between their relational properties.

Embodiment 20. The method of any one of Embodiments 1-19, wherein the seismic data comprise stack images; and wherein the stack images comprise pre-stack, partially-stack or post-stack images.

Embodiment 21. The method of any one of Embodiments 1-20, wherein the reference data points for interpreting the one or more relational properties are generated synthetically or from known hydrocarbon discoveries.

Embodiment 22: A system comprising: a processor; and a non-transitory machine-readable medium comprising instructions that, when executed by the processor, cause a computing system to perform a method according to any of embodiments 1-21.

Embodiment 23: A non-transitory machine-readable medium comprising instructions that, when executed by a processor, cause a computing system to perform a method according to any of embodiments 1-21.

REFERENCES

The following references are hereby incorporated by reference herein in their entirety, to the extent they are consistent with the disclosure of the present invention:

LeCun, Y., Bengio, Y., & Hinton, G., "Deep Learning.", Nature 521, 436-444, 2015.

Simonyan, K., & Zisserman, A., "Very Deep Convolutional Networks for Large-Scale Image Recognition", arXiv technical report, 2014.

Jonathan Long, Evan Shelhamer, and Trevor Darrell, "Fully Convolutional Networks for Semantic Segmentation", CVPR 2015.

Olaf Ronneberger, Philipp Fischer, Thomas Brox, "U-Net: Convolutional Networks for Biomedical Image Segmentation", Medical Image Computing and Computer-s Assisted Intervention (MICCAI), Springer, LNCS, Vol. 9351: pp. 234-241, 2015.

Zhang, C., Frogner, C., & Poggio, T., "Automated Geophysical Feature Detection with Deep Learning", GPU Technology Conference, 2016.

Jiang, Y., Wulff, B., "Detecting prospective structures in volumetric geo-seismic data using deep convolutional neural networks", Poster presented on Nov. 15, 2016 at to the annual foundation council meeting of the Bonn-Aachen International Center for Information Technology (b-it).

J. Mun, W. D. Jang, D. J. Sung and C. S. Kim, "Comparison of objective functions in CNN-based prostate magnetic resonance image segmentation", 2017 *IEEE International Conference on Image Processing (ICIP)*, Beijing, 2017, pp. 3859-3863.

K. H. Zou, S. K. Warfield, A. Bharatha, C. M. C. Tempany, M. R. Kaus, S. J. Haker, W. M. Wells III, F. A. Jolesz, R. Kikinis, "Statistical validation of image segmentation quality based on a spatial overlap index", Acad. Radiol., 11 (2) (2004), pp. 178-189.

I. J. Goodfellow, J. Pouget-Abadie, M. Mirza, B. Xu, D. Warde-Farley, S. Ozair, A. C. Courville, and Y. Bengio, "Generative adversarial nets", In Proceedings of NIPS, pp. 2672-2680, 2014.

Marc G Bellemare, Ivo Danihelka, Will Dabney, Shakir Mohamed, Balaji Lakshminarayanan, Stephan Hoyer, and Rémi Munos, "The Cramer Distance as a Solution to Biased Wasserstein Gradients", arXiv:1705.10743, 2017.

A. Veillard, O. Morère, M. Grout and J. Gruffeille, "Fast 3D Seismic Interpretation with Unsupervised Deep Learning: Application to a Potash Network in the North Sea", EAGE, 2018.

Jun-Yon Zhu, Taesung Park, Phillip Isola, and Alexei A. Efros. "Unpaired Image-to-Image Translation using Cycle-Consistent Adversarial Networks", in IEEE International Conference on Computer Vision (ICCV), 2017.

Xun Huang, Ming-Yu Liu, Serge Belongie, Jan Kautz, "Multimodal Unsupervised Image-to-Image Translation", ECCV 2018.

S. Akcay, A. Atapour-Abarghouei, T P Breckon, "Ganomaly: Semi-supervised anomaly detection via adversarial training", Asian Conference on Computer Vision, pp. 622-637.

What is claimed is:

1. A computer-implemented method for detecting geological elements or fluid in a subsurface from seismic images, the method comprising;
   accessing different sets of seismic data;
   performing unsupervised machine learning on the different sets of seismic data in order to learn one or more relational properties between the different sets of seismic data;
   interpreting the one or more relational properties using reference data points to identify one or both of the geological elements or the fluid; and
   performing one or more actions in the subsurface based on the identified one or both of the geological elements or the fluid;
   wherein the unsupervised machine learning comprises variational machine learning (VRL).

2. The method of claim 1, wherein the one or more relational properties are directed to amplitude changes with offset or angle (AVO or AVA) so that the one or more relational properties capture a form of Zoeppritz equation but further combined with geological features information captured by one or more absolute properties.

3. The method of claim 2, wherein applying the VRL to analyze AVO or AVA results in the one or more relational properties capturing amplitude information while the one or more absolute properties capturing structural information, with the one or more relational properties being independent of the one or more absolute properties.

4. The method of claim 1, wherein the different sets of seismic data comprise different sets of seismic stack images;
   wherein data a and b are generated by randomly sampling patches from the different sets of seismic stack images involving an unobserved random variable z;
   wherein a and z are generated from prior distributions $p\theta(a)$ and $p\theta(z)$, respectively;
   wherein b is generated from a conditional distribution $p\theta(b|a, z)$;
   wherein the VRL further generates variational distribution $q\phi(z|a, b)$; and
   wherein learning the one or more relational properties comprises learning model parameters $\theta$ and $\phi$ by optimizing a loss functional.

5. The method of claim 4, wherein the model parameter $\theta$ for $(b|a, z)$ is estimated by following a principle of maximum-likelihood.

6. The method of claim 4, further comprising relation-preserving data augmentation.

7. The method of claim 6, wherein the relation-preserving data augmentation comprises one or more functions that are invariant to a relationship between a and b, including one or both of random rotation or random amplitude scaling.

8. The method of claim 4, wherein the optimization of the loss functional comprises maximization of a variational lower bound functional.

9. The method of claim 8, wherein the optimization of the loss functional comprises additional regularization terms on the model parameters $\theta$ and $\phi$, including weight decaying and Tikhonov type regularizations.

10. The method of claim 8, wherein the optimization of the loss functional comprises additional regularization terms on $(b|a, z)$, including a generative adversarial network based penalties.

11. The method of claim 4, wherein $(b|a, z)$ is represented by one or more parametric functions including one or more neural networks.

12. The method of claim 11, wherein the one or more neural networks comprise an autoencoder with a latent space augmented with z.

13. The method of claim 4, wherein $(z|a, b)$ is represented by one or more parametric functions, including one or more neural networks.

14. The method of claim 13, wherein the one or more neural networks comprise a multi-layer convolution network that takes a, b as input and outputs z.

15. The method of claim 1, wherein identifying one or both of the geological elements or the fluid comprises detecting hydrocarbon presence;
   further comprising computing distributions of the one or more relational properties over the entire stack images; and
   wherein detecting the hydrocarbon presence is based on the distributions of the one or more relational properties.

16. The method of claim 1, wherein identifying one or both of the geological elements or the fluid comprises detecting hydrocarbon presence; and
   wherein performing the one or more actions in the subsurface comprises performing hydrocarbon management using the detected hydrocarbon presence.

17. The method of claim 16, wherein identifying one or both of the geological elements or the fluid comprise determining presence of sand.

18. The method of claim 1, wherein the different sets of seismic data comprise different sets of seismic images; and
   wherein the one or more relational properties are used in their raw form to find patches that have one or more similar or different relational properties by comparing Euclidean distance between their relational properties.

19. The method of claim 1, wherein the seismic data comprise stack images; and
   wherein the stack images comprise pre-stack, partially-stack or post-stack images.

20. The method of claim 1, wherein the reference data points for interpreting the one or more relational properties are generated synthetically or from known hydrocarbon discoveries.

* * * * *